US012234966B1

(12) United States Patent
Xu et al.

(10) Patent No.: US 12,234,966 B1
(45) Date of Patent: Feb. 25, 2025

(54) LED LAMP

(71) Applicant: SHENZHEN SNC OPTO ELECTRONIC CO., LTD., Guangdong (CN)

(72) Inventors: Jianyong Xu, Guangdong (CN); Anle Zhao, Guangdong (CN); Shengkang Chen, Guangdong (CN)

(73) Assignee: SHENZHEN SNC OPTO ELECTRONIC CO., LTD., Shenzhen (CN)

(*) Notice: Subject to any disclaimer, the term of this patent is extended or adjusted under 35 U.S.C. 154(b) by 0 days.

(21) Appl. No.: 18/631,005

(22) Filed: Apr. 9, 2024

(30) Foreign Application Priority Data

Dec. 5, 2023 (CN) ......................... 202311654138.9

(51) Int. Cl.
*F21V 14/06* (2006.01)
*F21V 21/08* (2006.01)
*F21V 23/00* (2015.01)
*F21V 31/00* (2006.01)
*F21Y 115/10* (2016.01)

(52) U.S. Cl.
CPC .............. *F21V 14/06* (2013.01); *F21V 21/08* (2013.01); *F21V 23/003* (2013.01); *F21V 31/005* (2013.01); *F21Y 2115/10* (2016.08)

(58) Field of Classification Search
CPC ........ F21V 14/06; F21V 21/08; F21V 23/003; F21V 31/005
See application file for complete search history.

(56) References Cited

U.S. PATENT DOCUMENTS

| | | | | |
|---|---|---|---|---|
| 4,823,243 A * | 4/1989 | Weigert | F21V 19/02 362/373 |
| 5,268,977 A * | 12/1993 | Miller | G02B 27/20 385/33 |
| 6,290,368 B1 * | 9/2001 | Lehrer | F21V 14/065 362/187 |
| 6,986,593 B2 * | 1/2006 | Rhoads | F21V 14/06 362/336 |
| 7,261,438 B2 * | 8/2007 | Alessio | F21V 14/06 362/268 |
| 7,543,941 B2 * | 6/2009 | Holder | F21V 14/04 353/43 |
| 9,140,431 B1 * | 9/2015 | Lee | F21V 13/045 |
| 9,784,440 B2 * | 10/2017 | Erdener | F21V 29/70 |
| 11,287,108 B1 * | 3/2022 | Hsu | F21V 23/003 |
| 11,421,837 B2 * | 8/2022 | Zhang | B08B 3/02 |
| 11,428,383 B1 * | 8/2022 | Zheng | F21V 5/02 |
| 11,994,281 B2 * | 5/2024 | Rasmussen | F21V 29/60 |

(Continued)

*Primary Examiner* — Arman B Fallahkhair

(57) ABSTRACT

An LED lamp includes a lamp holder provided with a light source cavity; an LED lamp panel mounted in the light source cavity; a driving power supply mounted on the lamp holder, the driving power supply being electrically connected to the LED lamp panel and configured to power the LED lamp panel; a lens panel rotatably provided in the lamp holder; and an adjusting assembly including a rotating member and a fixing member. The fixing member includes an adjusting rail, the rotating member is slidably provided in adjusting rail, when the rotating member slides along the adjusting rail, the lens panel rotates and moves close to the LED lamp panel or away from the LED lamp panel.

8 Claims, 18 Drawing Sheets

(56) References Cited

U.S. PATENT DOCUMENTS

| | | | | |
|---|---|---|---|---|
| 2010/0208371 | A1* | 8/2010 | Chao | F21V 14/06 359/824 |
| 2014/0049967 | A1* | 2/2014 | Zhou | F21K 9/23 362/287 |
| 2022/0252244 | A1* | 8/2022 | Erdener | F21V 23/007 |
| 2023/0332762 | A1* | 10/2023 | Erdener | F21V 7/00 |
| 2024/0255131 | A1* | 8/2024 | Yu | F21V 17/12 |

* cited by examiner

LED LAMP

CROSS-REFERENCE TO RELATED APPLICATIONS

This application claims priority of Chinese Patent Application No. 2023116541389, filed on Dec. 5, 2023, entitled “LED lamp”, the entire content of which is incorporated herein in its entirety.

TECHNICAL FIELD

The present disclosure relates to lighting technology, and in particular to an LED lamp.

BACKGROUND

Currently, LED lamps have high brightness, which can provide bright and uniform lighting effect, effectively improve the brightness of work environment and improve work efficiency. Compared with conventional lighting devices, the LED lamp also have lower energy consumption, which can save a large amount of energy and reduce the power consumption cost in enterprises. However, it is difficult for the current LED lamp to adjust a focal length of an LED lamp panel. When the focal length of the LED lamp needs to be adjusted, the entire LED lamp needs to be rotated, which is inconvenient.

Therefore, it is necessary to improve a structure of the LED lamp.

SUMMARY

According to various embodiments, an LED lamp with an adjustable focal length is provided.

An LED lamp includes a lamp holder provided with a light source cavity; an LED lamp panel mounted in the light source cavity; a driving power supply mounted on the lamp holder, the driving power supply being electrically connected to the LED lamp panel and configured to power the LED lamp panel; a lens panel rotatably provided in the lamp holder and covering the LED lamp panel; and an adjusting assembly including a rotating member provided on one of the lens panel and the lamp holder and a fixing member provided on another one of the lens panel and the lamp holder, wherein the fixing member includes an adjusting rail, the rotating member is slidably provided in adjusting rail, and when the rotating member slides along the adjusting rail, the lens panel rotates and moves close to the LED lamp panel or away from the LED lamp panel.

In one of the embodiments, the LED lamp further includes a sealing ring provided between the lens panel and the LED lamp plate, the lens panel is provided with a sealing groove, and the sealing ring is received in the sealing groove.

In one of the embodiments, the fixing member is fixedly mounted in the light source cavity of the lamp holder, the adjusting rail is an inclined sliding groove provided on the fixing member, the rotating member is located at an end of the lens panel and slidably received in the inclined sliding groove, and a front surface of the lens panel is provided with at least one urging portion.

In one of the embodiments, the lamp holder is provided with an inserting column in the light source cavity, the LED lamp plate is provided with an inserting hole, and the inserting column extends through the inserting hole to be connected to the lens panel.

In one of the embodiments, the LED lamp further includes a fixing ring strip and a sealing ring fixed between the lens panel and the fixing ring strip, and the sealing ring is a foldable rubber ring.

In one of the embodiments, the adjusting assembly includes an adjusting knob located on a front side of the lens panel and rotatably connected to the lamp holder, the rotating member is provided on an inner side of the adjusting knob, the fixing member is an annular fixing member provided in a middle portion of the lens panel, the adjusting rail is an inclined sliding groove, and the rotating member is slidably received in the inclined sliding groove.

In one of the embodiments, the lens panel is provided with a plurality of positioning columns, the LED lamp plate is provided with a plurality of limiting holes, and the plurality of positioning posts are inserted into the plurality of limiting holes.

In one of the embodiments, the LED lamp further includes a pressing frame assembly located on an outer side of the LED lamp plate, the pressing frame assembly includes a pressing frame and a glass plate, the pressing frame presses the lens panel, or the glass plate presses the lens panel.

In one of the embodiments, the fixing member includes a lens bracket and a bracket base, an end of the lens bracket is fixedly mounted on the bracket base, another end of the lens bracket is buckled with the lens panel, the adjusting assembly includes an adjusting rod and an adjusting knob, an end of the adjusting rod is provided with a gear, the adjusting rail is a spiral groove provided on another end of the adjusting rod, the adjusting knob is located on a rear side of the lamp holder, an inner side of the adjusting knob is provided with teeth, the lamp holder is provided with a first through hole, the gear extends through the first through hole and is engaged with the teeth of the adjusting knob, the bracket base is further provided with a second through hole corresponding to the first through hole, the rotating member is located on an inner side of the second through hole, the adjusting rod is received in the second through hole, and the rotating member is slidably received in the spiral groove.

In one of the embodiments, the LED lamp further includes a pressing sheet provided between the adjusting knob and a rear cover of the lamp holder and a sealing ring provided between the adjusting rod and the inner side of the rear cover of the lamp holder, an outer side of the rear cover of the lamp holder is provided with a pressing sheet groove, the pressing sheet is received in the pressing sheet groove, an inner side of the rear cover of the lamp holder is provided with a rubber ring groove, and the sealing ring is received in the rubber ring groove.

These and other objects, advantages, purposes and features will become apparent upon review of the following specification in conjunction with the drawings.

BRIEF DESCRIPTION OF THE DRAWINGS

The drawings are only for illustrative purposes and represent only schematic views rather than actual drawings, which cannot be understood as limitations of the present disclosure. In order to better illustrate the embodiments of the present disclosure, some components in the drawings may be omitted, enlarged or reduced, which does not represent the size of the actual product. For those skilled in the art, some well-known structures in the drawings and the descriptions thereof may be omitted.

REFERENCE SIGNS

Figure 1:
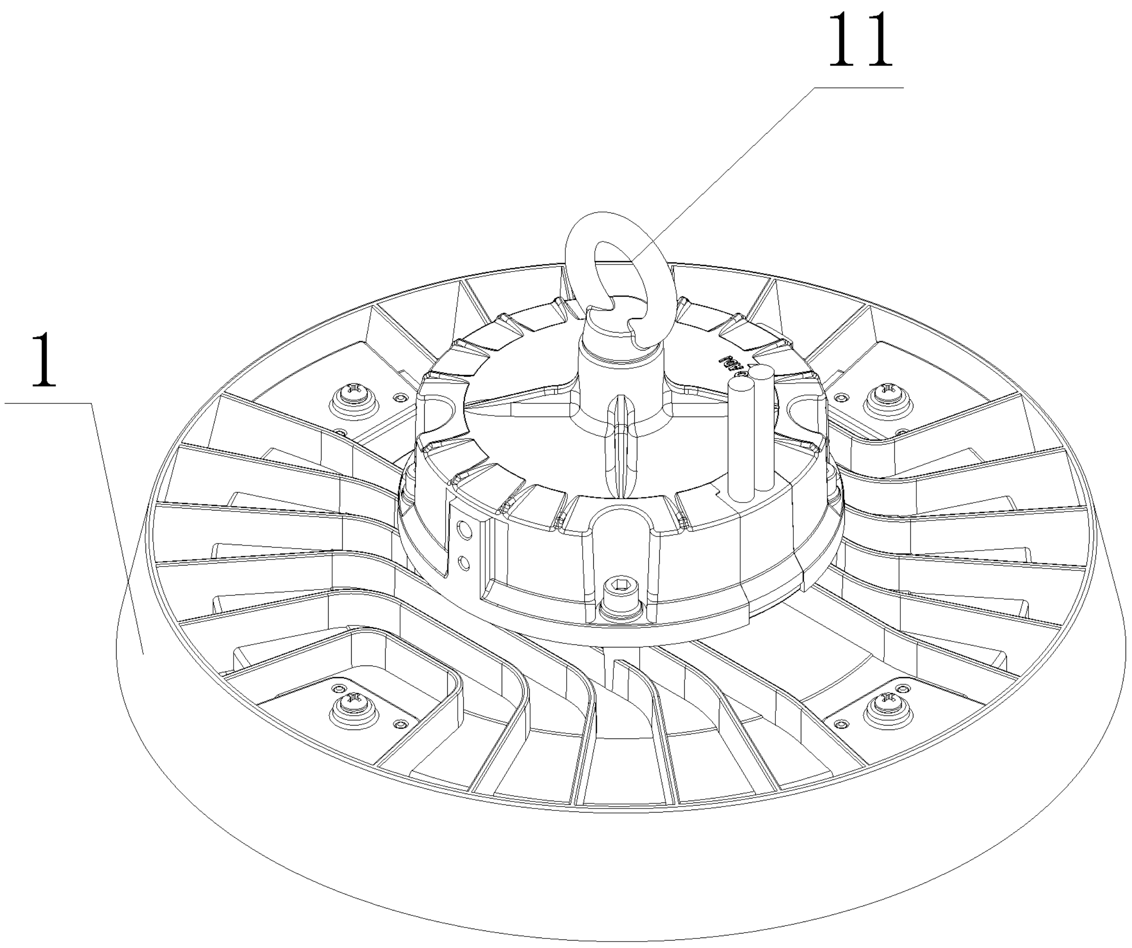
FIG. 1 is a perspective view of an LED lamp according to a first embodiment.
Figure 2:
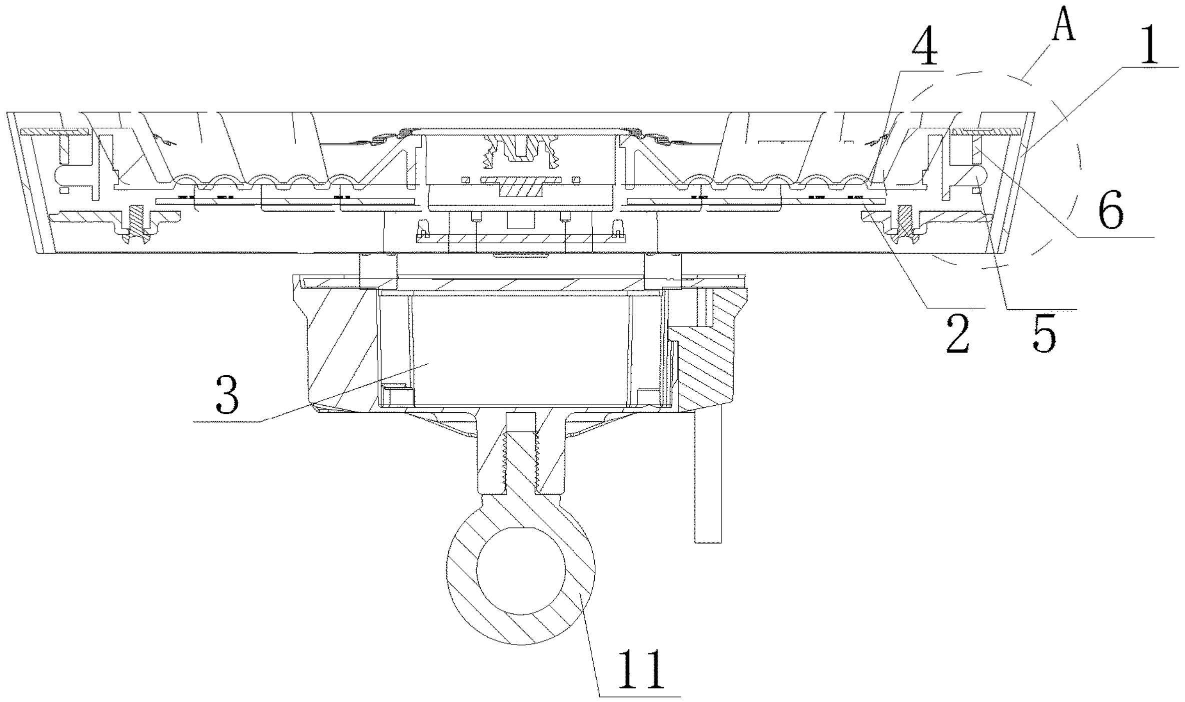
FIG. 2 is a cross-sectional view of the LED lamp shown in FIG. 1.
Figure 3:
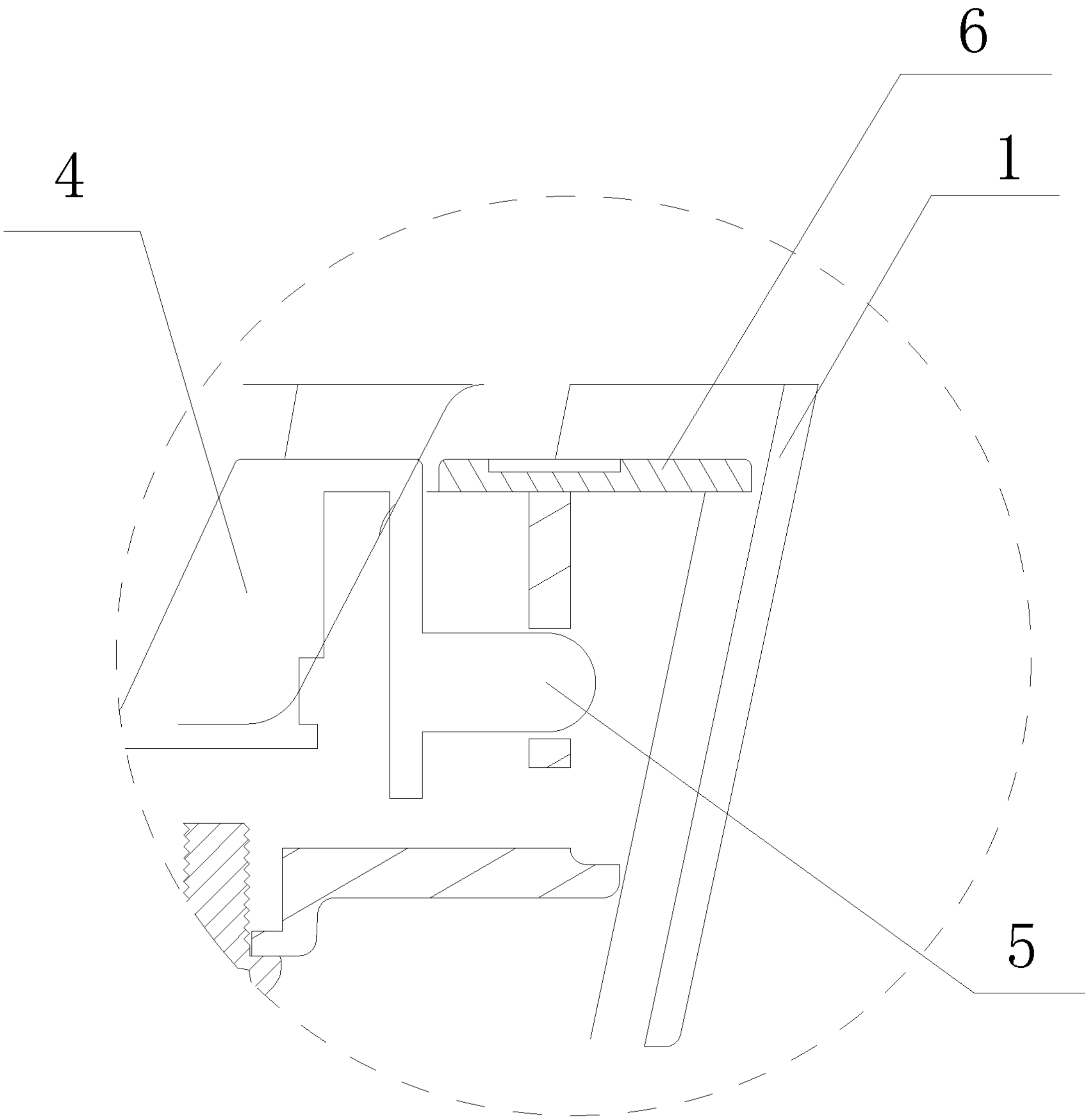
FIG. 3 is an enlarged view of portion A of FIG. 2.

Lamp holder; 2. LED lamp panel; 3. Driving power supply; 4. Lens panel; 5. Rotating member; 6. Fixing member; 7. Adjusting rail; 8. Urging portion; 9. Sealing ring; 10. Sealing groove; 11. Hanging ring; 12. Inserting column; 13. Fixing ring strip; 14. Adjusting knob; 15. Positioning column; 16. Pressing frame; 17. Glass plate; 18. Lens bracket; 19. Bracket base; 20. Buckle; 21. Adjusting rod; 22. Pressing sheet; 23. Mounting bracket; 24. Inserting hole; 30. Rear cover; 31. First through hole 31; 32. Second through hole.

DETAILED DESCRIPTION OF THE EMBODIMENTS

The technical solution in the embodiment of the present application will be clearly and completely described below in conjunction with the drawings in the embodiment of the application. Apparently, the described embodiments are only some of the embodiments of the application, not all of them. Based on the embodiments in the present application, all other embodiments obtained by a person skilled in the art without making creative efforts shall all fall within the protection scope of the present application.

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Referring to FIGS. 1 to 6, an LED lamp is provided according to a first embodiment of the present disclosure, the LED lamp includes a lamp holder 1, an LED lamp panel 2, and a driving power supply 3 mounted on the lamp holder 1. The lamp holder 1 is provided with a light source cavity, and the LED lamp panel 2 is mounted in the light source cavity. The driving power supply 3 is electrically connected to the LED lamp panel 2 and is configured to power the LED lamp panel 2.

The LED lamp further includes a lens panel 4 and an adjusting assembly. The lens panel 4 is rotatably provided in the lamp holder 1 and covers the LED lamp panel 2. The adjusting assembly includes a rotating member 5 and a fixing member 6. In one embodiment, the rotating member 5 is provided on the lens panel 4, and the fixing member 6 is provided on the lamp holder 1. Alternatively, the fixing member 6 is provided on the lens panel 4, and the rotating member 5 provided on the lamp holder 1. The fixing member 6 includes an adjusting rail 7, and the rotating member 5 is slidably provided in adjusting rail 7. When the rotating member 5 is rotated, the rotating member 5 can slide along the adjusting rail 7, such that the lens panel 4 can move close to the LED lamp panel 2 or away from the LED lamp panel 2, thereby adjusting a focal length of the LED lamp.

Figure 4:
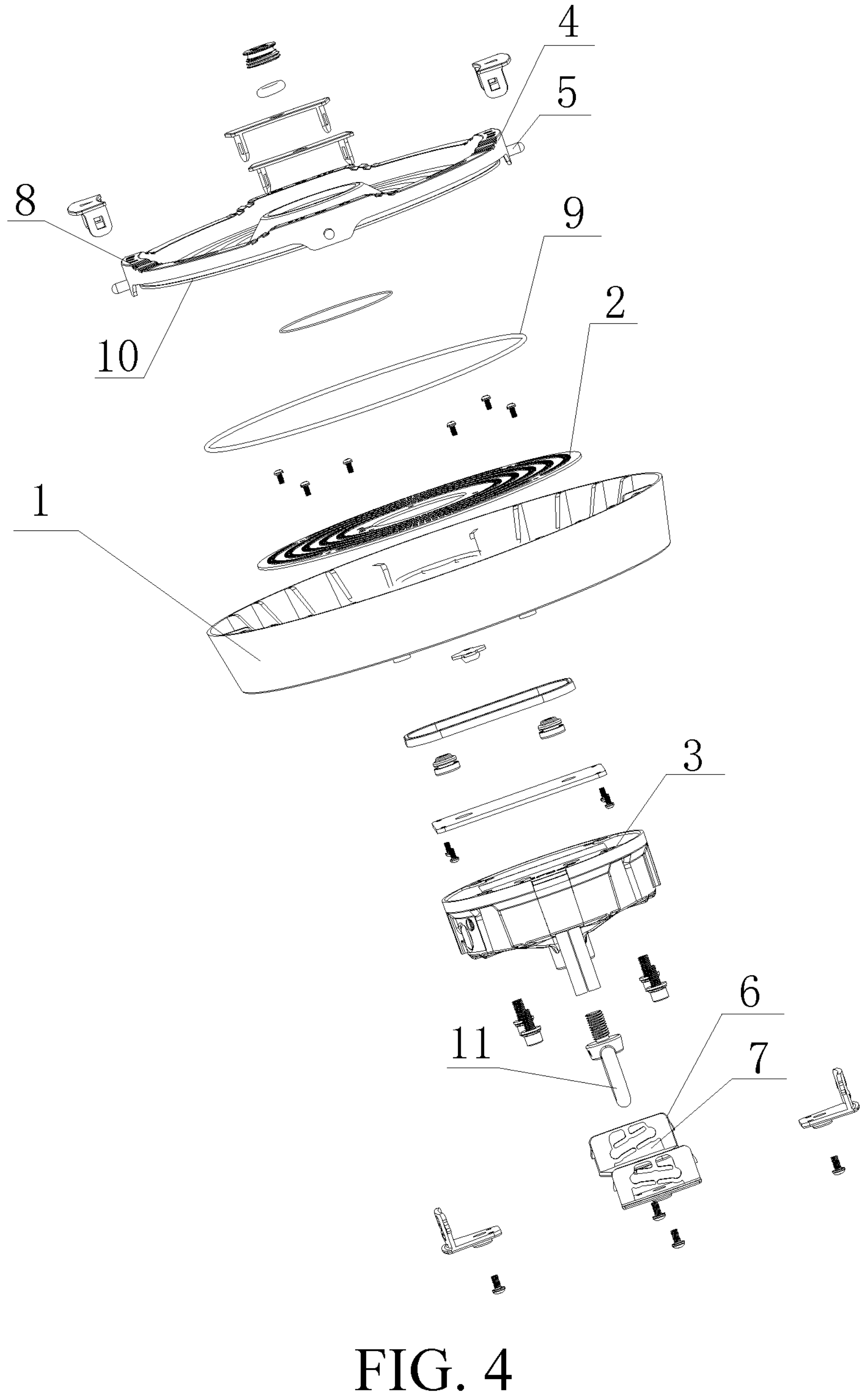
FIG. 4 is an exploded view of the LED lamp shown in FIG. 1.
Figure 5:
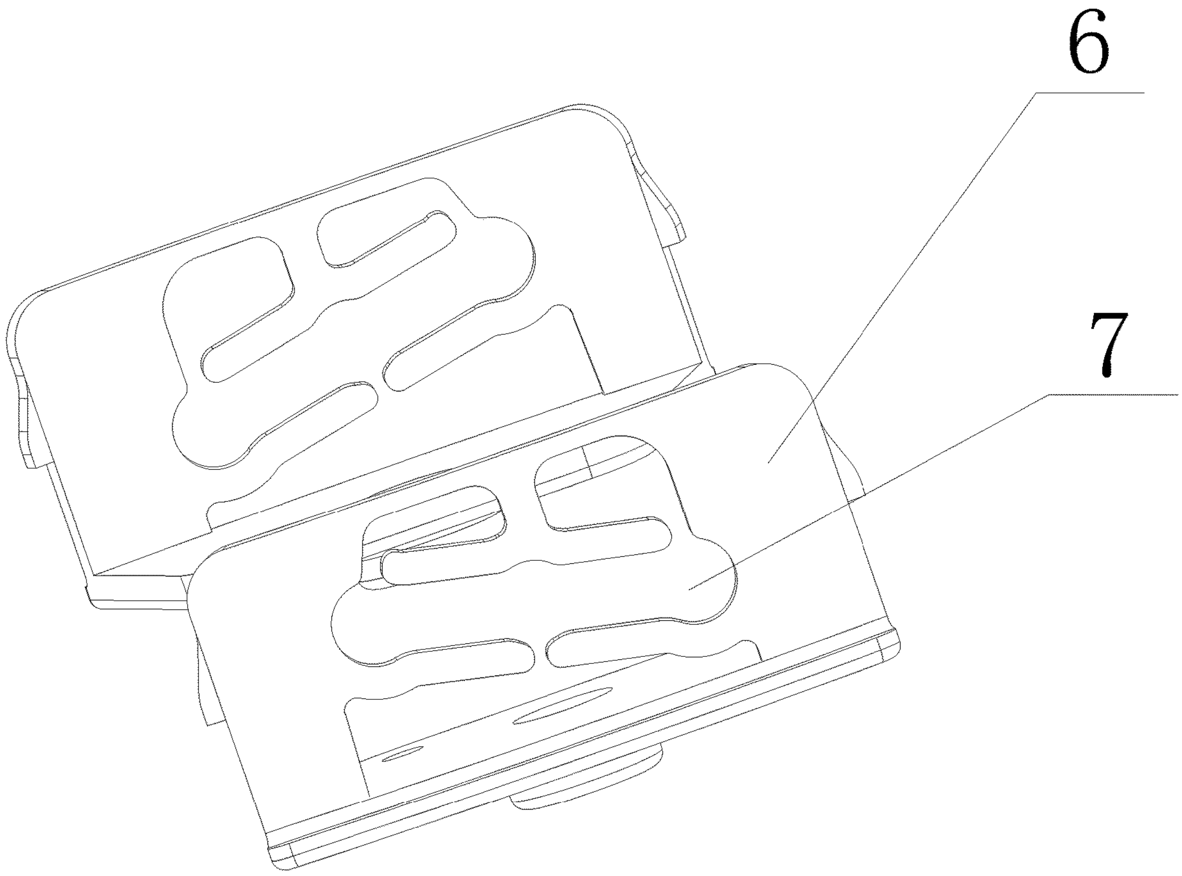
FIG. 5 is a perspective view of an adjusting fixing sheet according to an embodiment.
Figure 6:
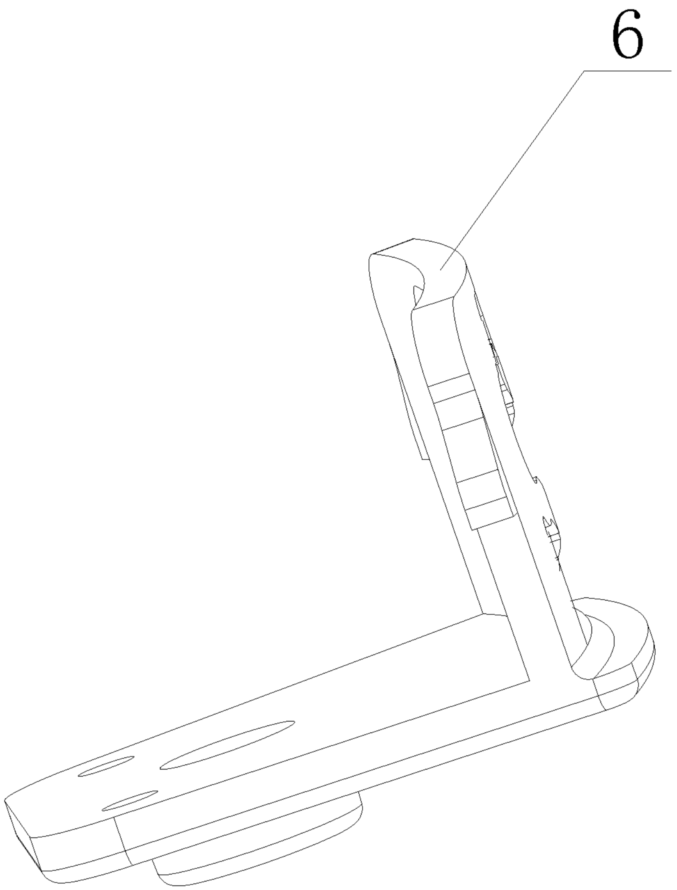
FIG. 6 is a perspective view of the adjusting fixing sheet viewed from another aspect.
Figure 7:
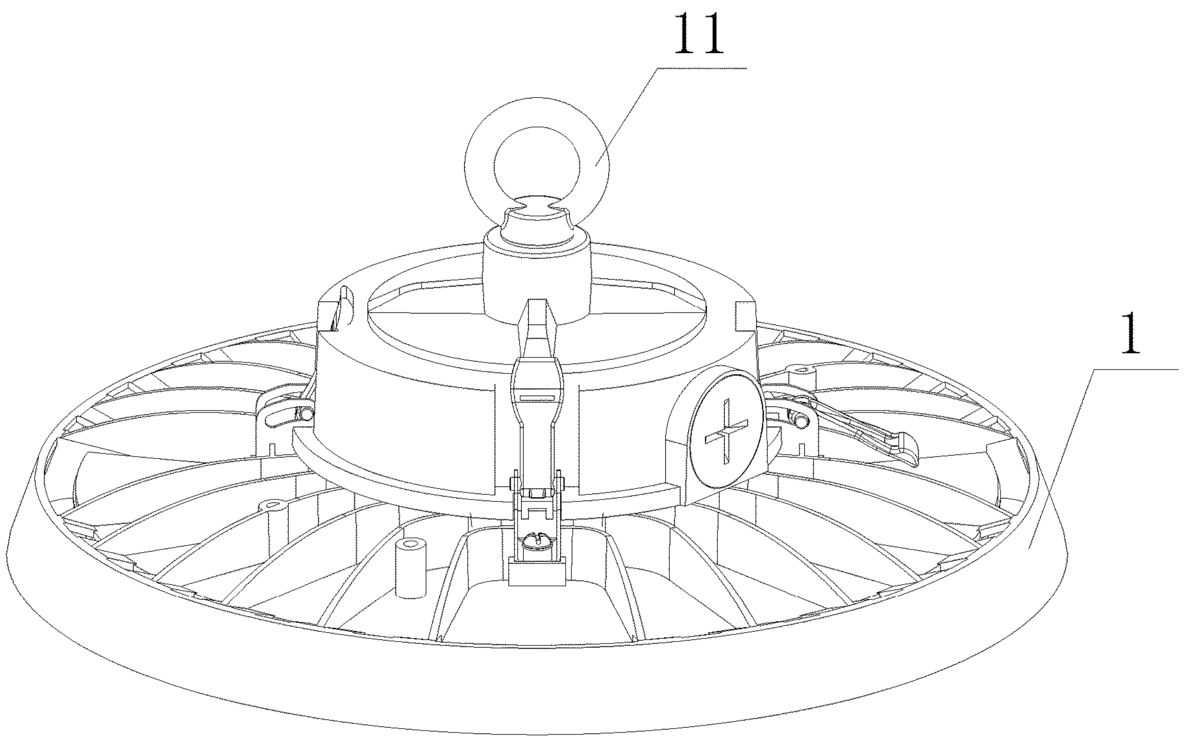
FIG. 7 is a perspective view of an LED lamp according to a second embodiment.
Figure 8:
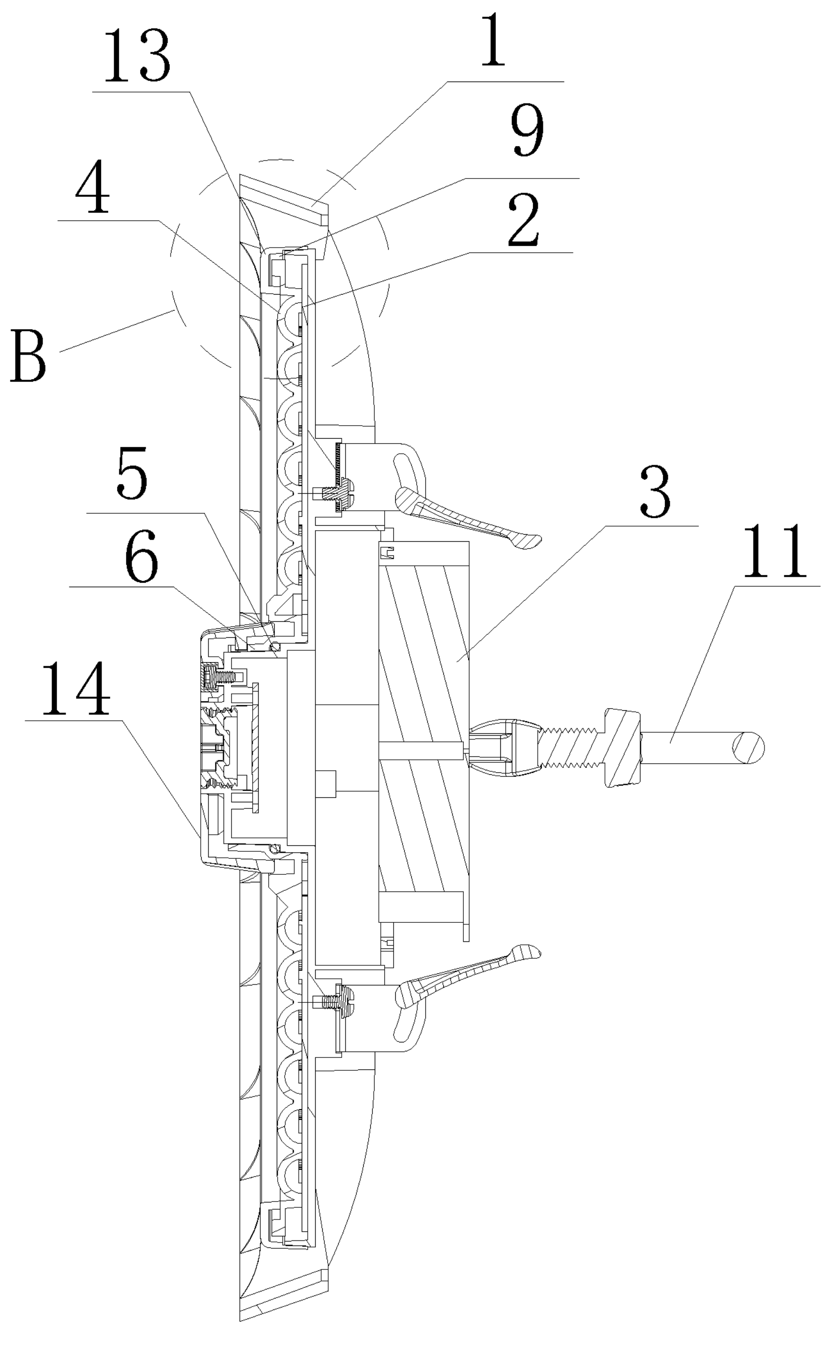
FIG. 8 is a cross-sectional view of the LED lamp shown in FIG. 7.
Figure 9:
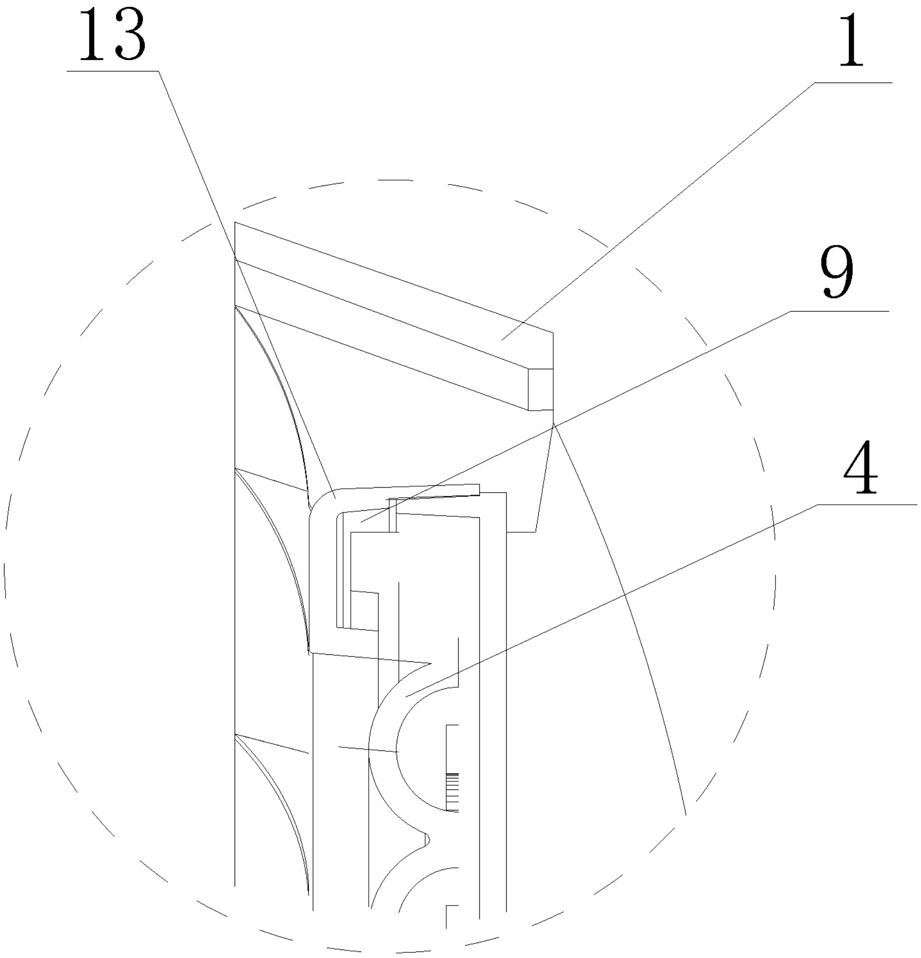
FIG. 9 is an enlarged view of portion B of FIG. 8.
Figure 10:
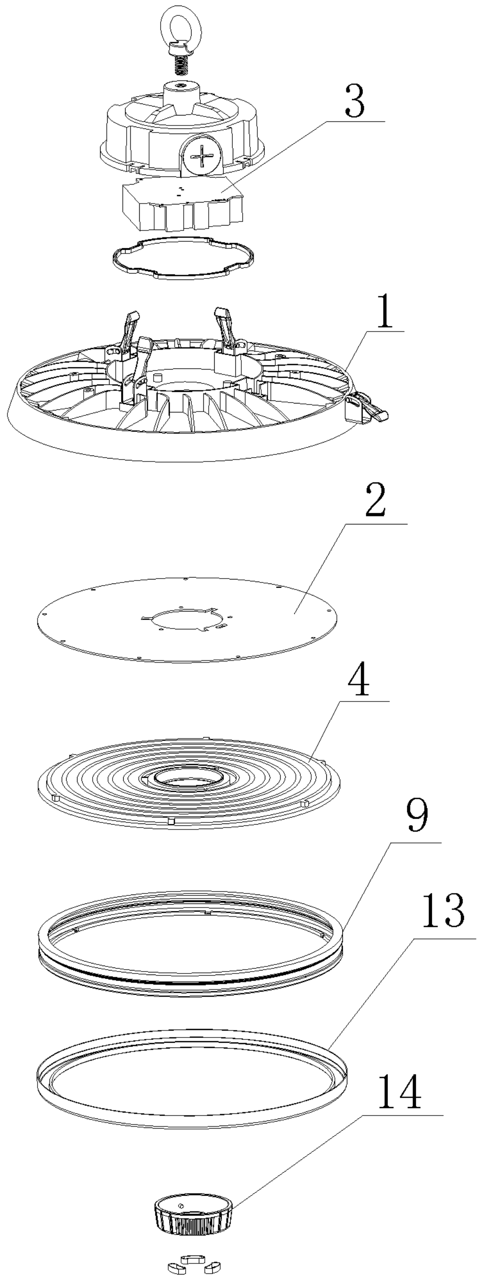
FIG. 10 is an exploded view of the LED lamp shown in FIG. 7.

Referring to FIG. 4 to FIG. 6, in one embodiment, the fixing member 6 is an arc-shaped fixing sheet fixedly mounted in the light source cavity of the lamp holder 1, and the adjusting rail 7 is an inclined sliding groove provided on the fixing member 6. The rotating member 5 is a protruding shaft located at an end of the lens panel 4 and slidably received in the inclined sliding groove.

Referring to FIG. 4, a front surface of the lens panel 4 is provided with at least one urging portion 8. In the embodiment, the urging portion 8 is substantially step-shaped. When a force is exerted on the urging portion 8 to rotate the lens panel 4 clockwise, since the adjusting rail 7 is immovable, the rotating member 5 will rotate clockwise along the inclined sliding groove, thereby causing the lens panel 4 to move upward. That is, the lens panel 4 moves away from the LED lamp panel 2.

When a force is exerted on the urging portion 8 to rotate the lens panel 4 counterclockwise, since the adjusting rail 7 is also immovable, the rotating member 5 will rotate counterclockwise along the inclined sliding groove, thereby causing the lens panel 4 to move downward. That is, the lens panel 4 moves close to the LED lamp panel 2. In this way, the focal length of the LED lamp is adjusted.

According to the aforementioned LED lamp, when adjusting the focal length of the LED lamp, only the urging portion 8 needs to be rotated, there is no need to rotate the entire LED lamp, so that the operation is simple and convenient.

Referring to FIG. 4, the LED lamp further includes a sealing ring 9 provided between the lens panel 4 and the LED lamp plate 2. The lens panel 4 is further provided with a sealing groove 10. The sealing ring 9 is received in the sealing groove 10, so that the LED lamp has good waterproof effect.

Referring to FIG. 1, the lamp holder 1 is provided with a hanging ring 11 configured to mount the LED lamp on a ceiling.

Referring to FIG. 7 to FIG. 14, an LED lamp is provided according to a second embodiment of the present disclosure, which is similar to the LED lamp in the first embodiment, and the difference lies mainly in that the adjusting assembly includes an adjusting knob 14 located on a front side of the lens panel 4 and rotatably connected to the lamp holder 1. The rotating member 5 is provided on an inner side of the adjusting knob 14. The fixing member 6 is an annular fixing sheet provided in a middle portion of the lens panel 4. The adjusting rail 7 is an inclined sliding groove, and the rotating member 5 is slidably received in the inclined sliding groove.

When the adjusting knob 14 is rotated clockwise, the rotating member 5 can rotate clockwise along the inclined sliding groove, thereby causing the lens panel 4 to move upward. That is, the lens panel 4 moves close to the LED lamp panel 2.

When the adjusting knob 14 is rotated counterclockwise, the rotating member 5 rotates counterclockwise along the inclined sliding groove, thereby causing the lens panel 4 to move downward. That is, the lens panel 4 moves away from the LED lamp panel 2. In this way, the focal length of the LED lamp is adjusted.

Figure 13:
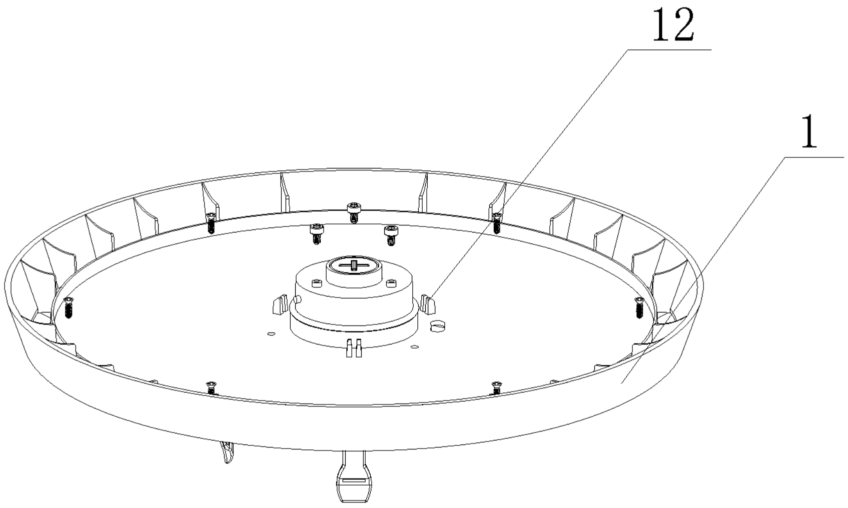
FIG. 13 is an enlarged view of a lamp holder shown in FIG. 11.
Figure 14:
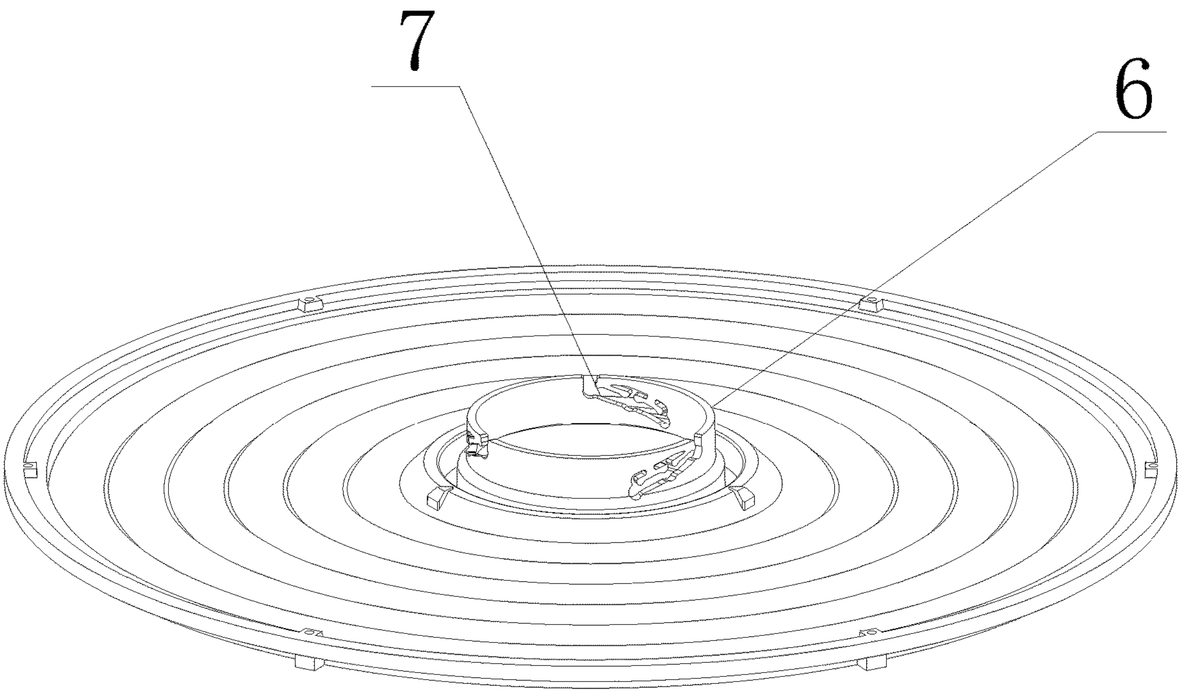
FIG. 14 is an enlarged view of a lens panel shown in FIG. 11.
Figure 15:
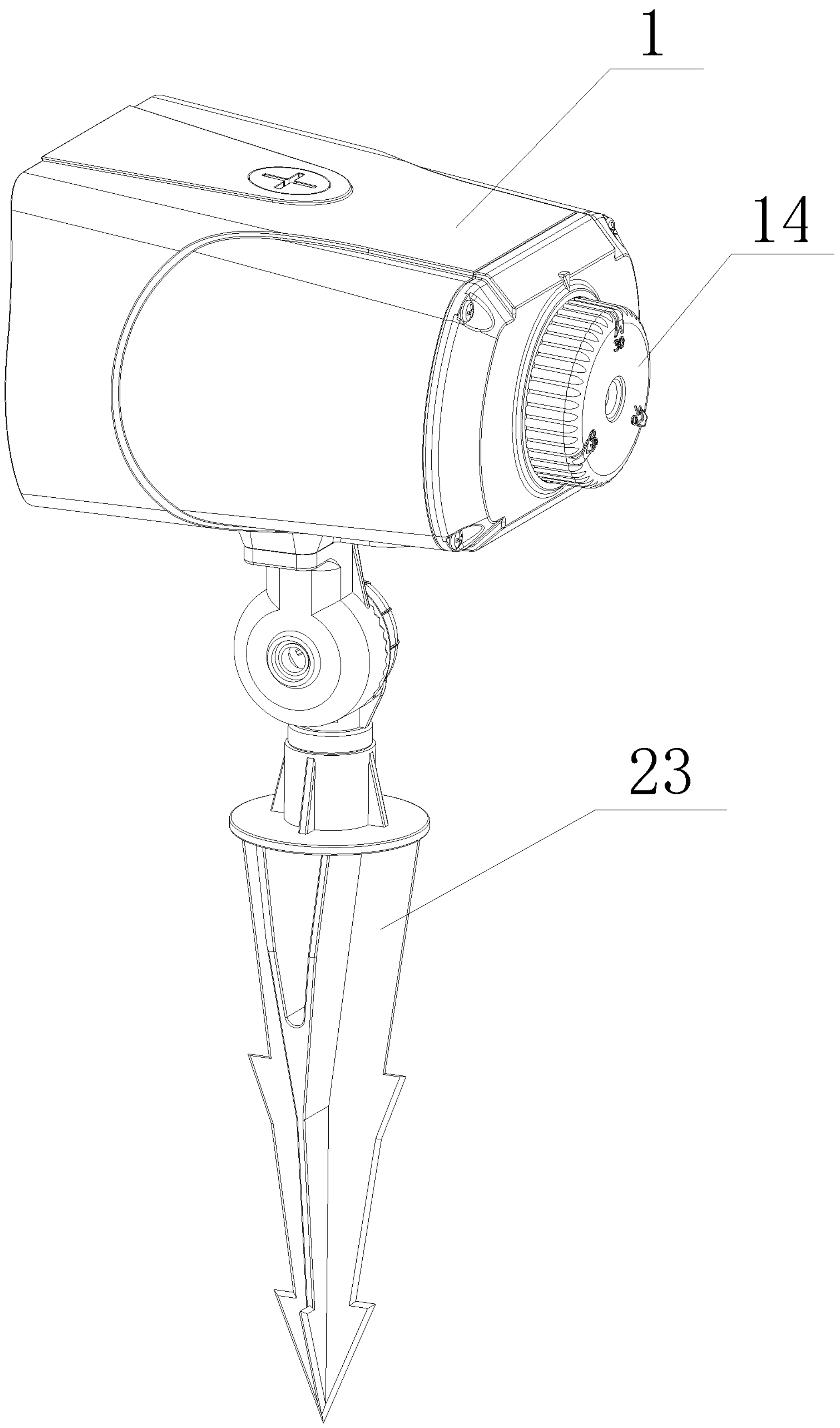
FIG. 15 is a perspective view of an LED lamp according to a third embodiment.
Figure 16:
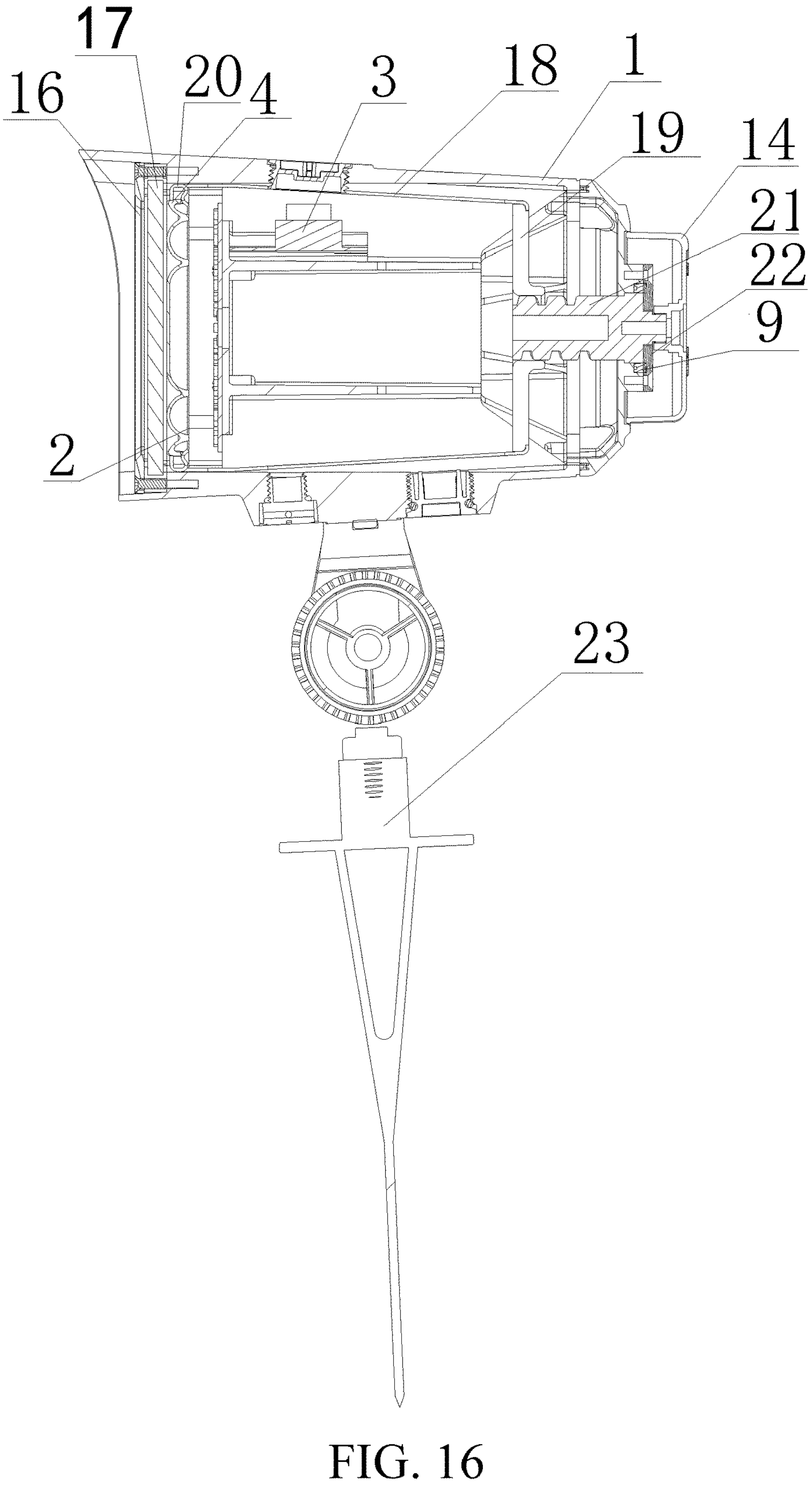
FIG. 16 is a cross-sectional view of the LED lamp shown in FIG. 15.

Referring to FIG. 13, the lamp holder 1 is provided with a plurality of inserting columns 12 in the light source cavity. The LED lamp plate 2 is provided with a plurality of inserting holes 24 corresponding to the inserting columns 12. The inserting columns 12 extend through the inserting holes 24 and are connected to the lens panel 4, which can prevent the lens panel 4 from deviating when rotating upward and downward.

Figure 11:
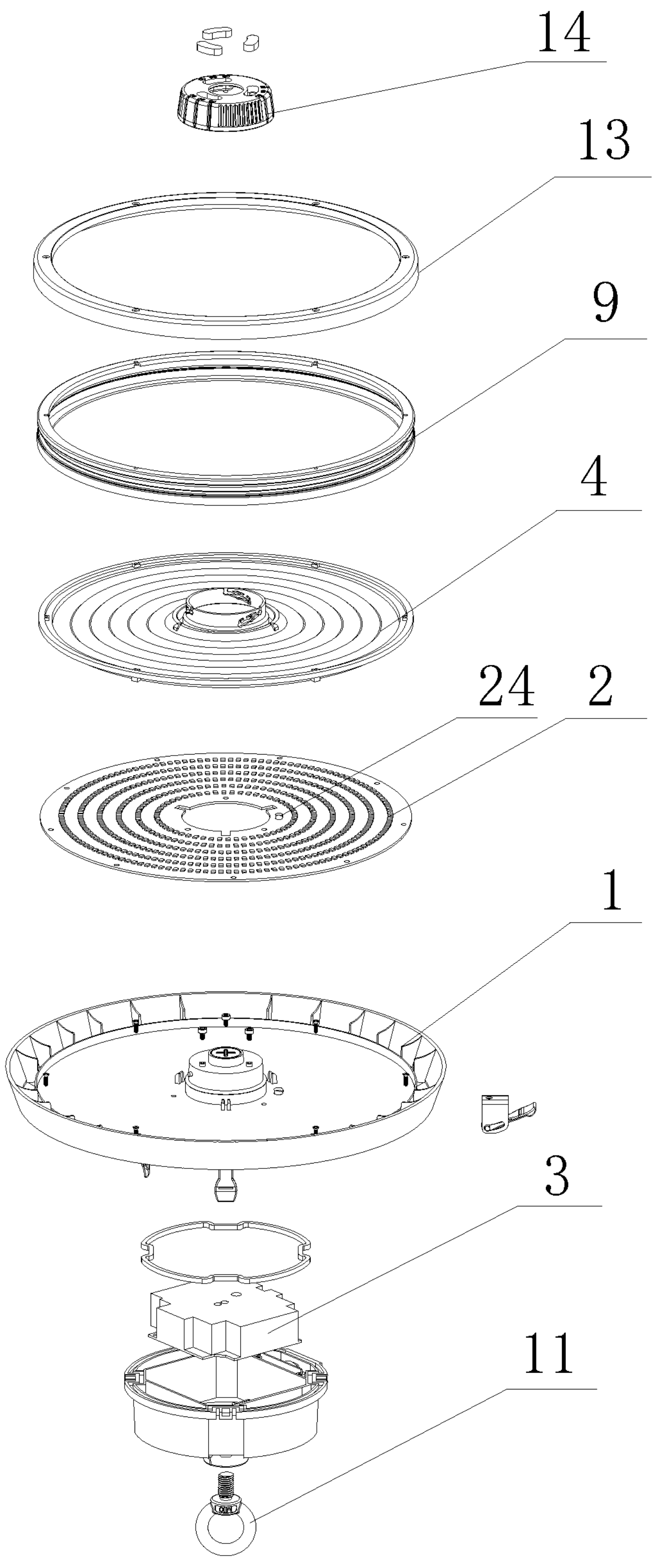
FIG. 11 is similar to FIG. 10, but viewed from another aspect.
Figure 12:
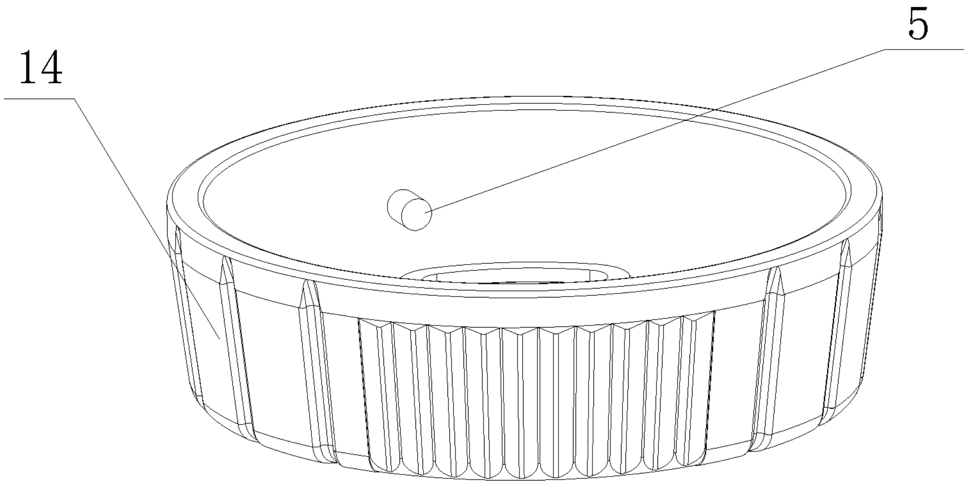
FIG. 12 is an enlarged view of an adjusting knob shown in FIG. 10.

Referring to FIG. 11, the LED lamp further includes a fixing ring strip 13 and a sealing ring 9 fixed between the lens panel 4 and the fixing ring strip 13, so that the LED lamp has good waterproof effect. The sealing ring 9 may be a foldable rubber ring.

Referring to FIG. 15 to FIG. 19, an LED lamp is provided according to a third embodiment of the present disclosure, which is similar to the LED lamp in the first embodiment, and the difference lies mainly in that the fixing member 6 includes a lens bracket 18 and a bracket base 19. One end of the lens bracket 18 is fixedly mounted on the bracket base 19, the other end of the lens bracket 18 is provided with a buckle 20, and the lens bracket 18 is detachably connected to the lens panel 4 through the buckle 20. The adjusting assembly includes an adjusting rod 21 and an adjusting knob 14. One end of the adjusting rod 21 is provided with a gear, and the adjusting rail 7 is a spiral groove provided on the other end of the adjusting rod 21. The adjusting knob 14 is located on a rear side of the lamp holder 1, and an inner side of the adjusting knob 14 is provided with teeth. A rear cover 30 of the lamp holder 1 is provided with a first through hole 31. The adjusting rod 21 rotatably extends through the first through hole 31, and the gear is engaged with the teeth of the adjusting knob 14. The bracket base 19 is further provided with a second through hole 32 cooperating with the adjusting rod 21. The rotating member 5 is a protruding shaft located on an inner side of the second through hole 32. The adjusting rod 21 is received in the second through hole 32, and the rotating member 5 is slidably received in the spiral groove.

When the adjusting knob 14 is rotated clockwise, the adjusting rod 21 and the spiral groove on the adjusting rod 21 rotates clockwise, the protruding shaft will slide along the spiral groove, such that the lens bracket 18 and the bracket base 19 will move rightward. That is, the lens panel 4 moves close to the LED lamp panel 2.

When the adjusting knob 14 is rotated counterclockwise, the adjusting rod 21 and the spiral groove on the adjusting rod 21 rotates counterclockwise, the protruding shaft will slide along the spiral groove, such that the lens bracket 18 and the bracket base 19 will move leftward. That is, the lens panel 4 moves away from the LED lamp panel 2. In this way, the focal length of the LED lamp can be adjusted.

Figure 17:
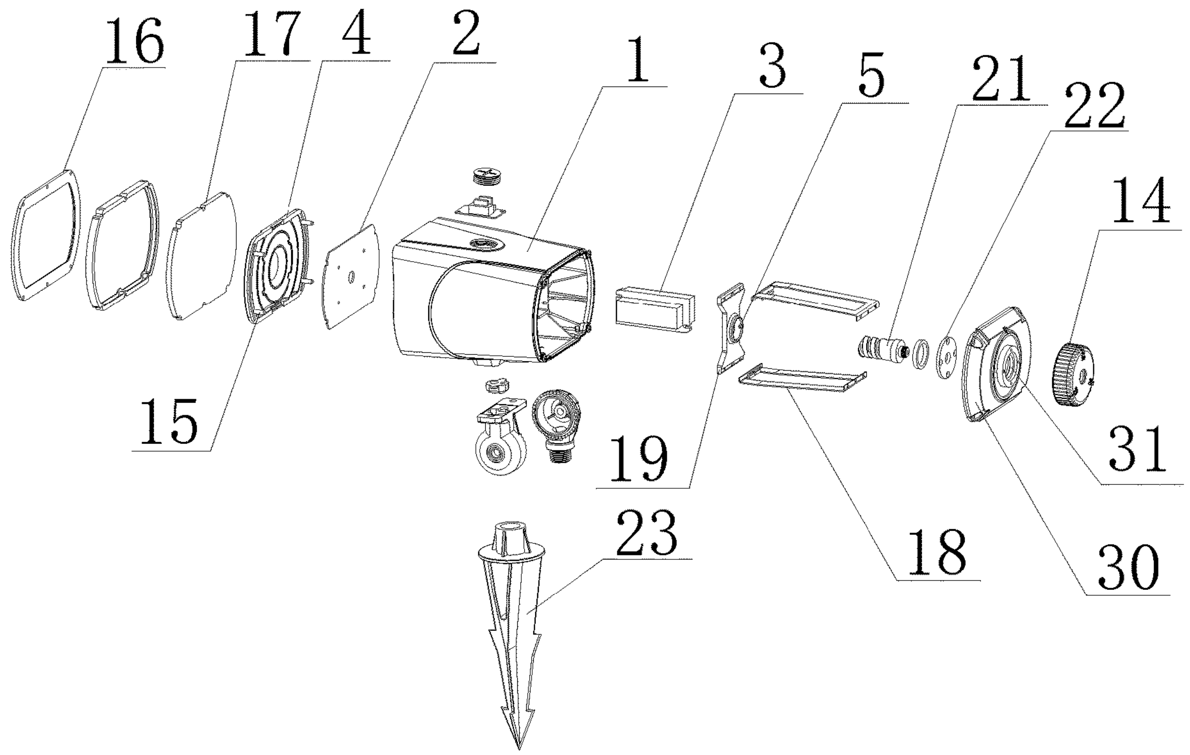
FIG. 17 is an exploded view of the LED lamp shown in FIG. 15.
Figure 18:
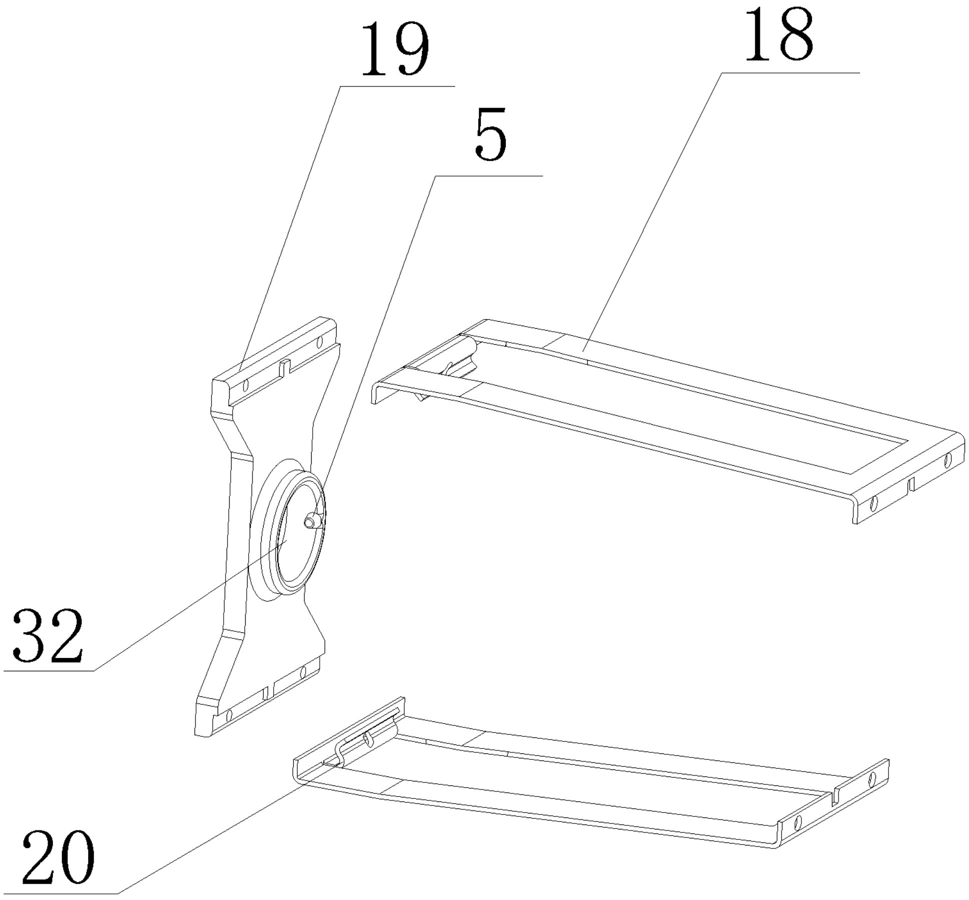
FIG. 18 is an enlarged view of a fixing member shown in FIG. 17.

Referring to FIG. 17, the lens panel 4 is provided with a plurality of positioning columns 15. The LED lamp plate 2 is provided with a plurality of limiting holes corresponding to the positioning columns 15. The plurality of positioning posts 15 are inserted into the plurality of limiting holes, which can prevent the lens panel 4 from deviating when rotating upward and downward.

Referring to FIG. 17, the LED lamp further includes a pressing frame assembly located on an outer side of the LED lamp plate 2. The pressing frame assembly includes a pressing frame 16 and a glass plate 17, and the pressing frame 16 presses the lens panel 4. Alternatively, the glass plate 17 presses the lens panel 4.

Figure 19:
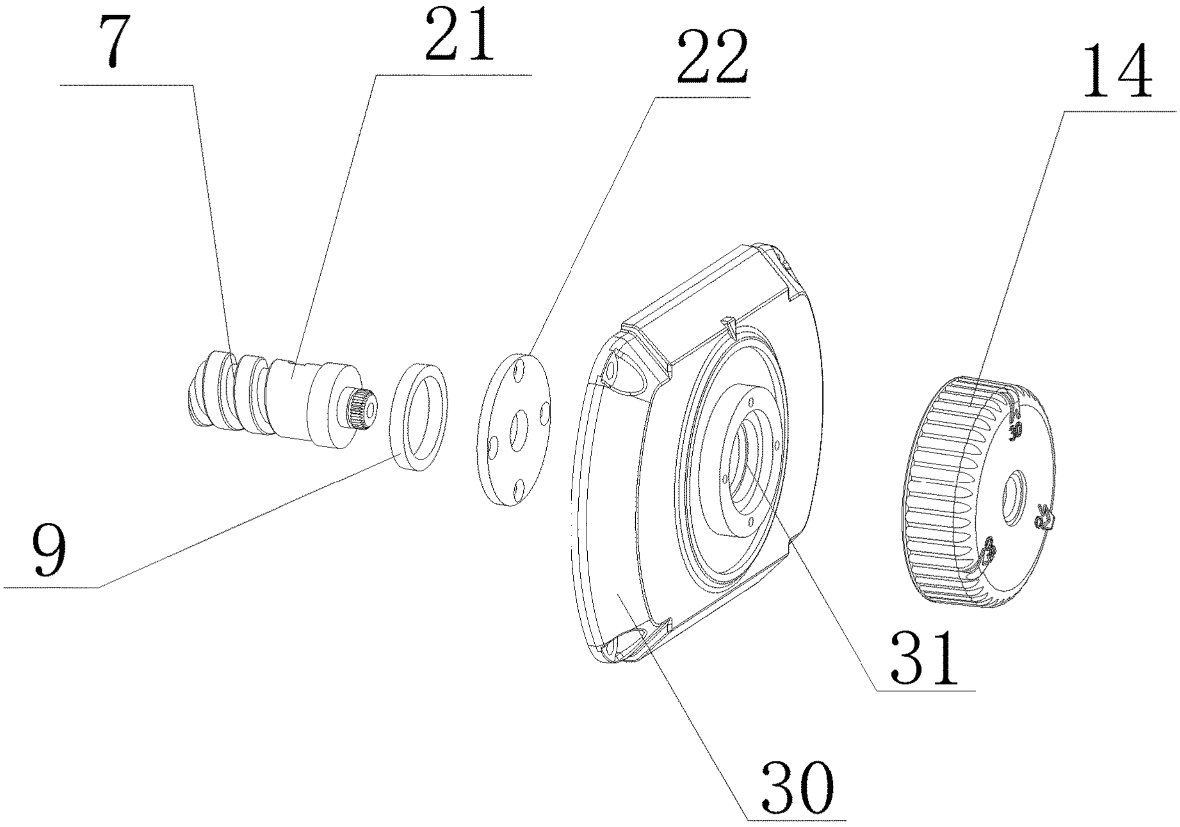
FIG. 19 is an enlarged view of a rotating member shown in FIG. 17.

Referring to FIG. 19, the LED lamp further includes a pressing sheet 22 provided between the adjusting knob 14 and the rear cover of the lamp holder 1. An outer side of the rear cover of the lamp holder 1 is provided with a pressing sheet groove. The pressing sheet 22 is received in the pressing sheet groove. An inner side of the rear cover of the lamp holder 1 is provided with a rubber ring groove. The LED lamp further includes a sealing ring 9 provided between the adjusting rod 21 and the inner side of the rear cover of the lamp holder 1. The sealing ring 9 is received in the rubber ring groove.

The LED lamp further includes a mounting bracket 23 connected to a side of the lamp holder 1, which supports the lamp holder 1.

According to the LED lamp, when adjusting the focal length of the LED lamp, it is only necessary to rotate the rotating member 5 or the adjusting knob 14.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a lamp holder provided with a light source cavity;

an LED lamp panel mounted in the light source cavity;

a driving power supply mounted on the lamp holder, the driving power supply being electrically connected to the LED lamp panel and configured to power the LED lamp panel;

a lens panel rotatably provided in the lamp holder and covering the LED lamp panel; and an adjusting assembly comprising a rotating member provided on one of the lens panel and the lamp holder and a fixing member provided on another one of the lens panel and the lamp holder, wherein the fixing member comprises an adjusting rail, the rotating member is slidably provided in adjusting rail, and when the rotating member slides along the adjusting rail, the lens panel rotates and moves close to the LED lamp panel or away from the LED lamp panel;

wherein the fixing member comprises a lens bracket and a bracket base, an end of the lens bracket is fixedly mounted on the bracket base, another end of the lens bracket is buckled with the lens panel, the adjusting assembly comprises an adjusting rod and an adjusting knob, an end of the adjusting rod is provided with a gear, the adjusting rail is a spiral groove provided on another end of the adjusting rod, the adjusting knob is located on a rear side of the lamp holder, an inner side of the adjusting knob is provided with teeth, the lamp holder is provided with a first through hole, the gear extends through the first through hole and is engaged with the teeth of the adjusting knob, the bracket base is further provided with a second through hole corresponding to the first through hole, the rotating member is located on an inner side of the second through hole, the adjusting rod is received in the second through hole, and the rotating member is slidably received in the spiral groove;

wherein the LED lamp further comprises a pressing sheet provided between the adjusting knob and a rear cover of the lamp holder and a scaling ring provided between the adjusting rod and the inner side of the rear cover of the lamp holder, wherein an outer side of the rear cover of the lamp holder is provided with a pressing sheet groove, the pressing sheet is received in the pressing sheet groove, an inner side of the rear cover of the lamp holder is provided with a rubber ring groove, and the sealing ring is received in the rubber ring groove.

2. The LED lamp according to claim 1, wherein the lamp holder is provided with an inserting column in the light source cavity, the LED lamp plate is provided with an inserting hole, and the inserting column extends through the inserting hole to be connected to the lens panel.

3. The LED lamp according to claim 2, further comprising a fixing ring strip and a sealing ring fixed between the lens panel and the fixing ring strip, wherein the sealing ring is a foldable rubber ring.

4. The LED lamp according to claim 1, further comprising a sealing ring provided between the lens panel and the LED lamp plate, wherein the lens panel is provided with a sealing groove, and the sealing ring is received in the sealing groove.

5. The LED lamp according to claim 1, wherein the fixing member is fixedly mounted in the light source cavity of the lamp holder, the adjusting rail is an inclined sliding groove provided on the fixing member, the rotating member is located at an end of the lens panel and slidably received in the inclined sliding groove, and a front surface of the lens panel is provided with at least one urging portion.

6. The LED lamp according to claim 1, wherein the adjusting assembly comprises an adjusting knob located on a front side of the lens panel and rotatably connected to the lamp holder, the rotating member is provided on an inner side of the adjusting knob, the fixing member is an annular fixing member provided in a middle portion of the lens panel, the adjusting rail is an inclined sliding groove, and the rotating member is slidably received in the inclined sliding groove.

7. The LED lamp according to claim 1, wherein the lens panel is provided with a plurality of positioning columns, the LED lamp plate is provided with a plurality of limiting holes, and the plurality of positioning posts are inserted into the plurality of limiting holes.

8. The LED lamp according to claim 1, further comprising a pressing frame assembly located on an outer side of the LED lamp plate, wherein the pressing frame assembly comprises a pressing frame and a glass plate, the pressing frame presses the lens panel, or the glass plate presses the lens panel.

* * * * *